(No Model.) 2 Sheets—Sheet 2.
W. R. DRUECK.
CAN STUFFING MACHINE.
No. 367,027. Patented July 26, 1887.
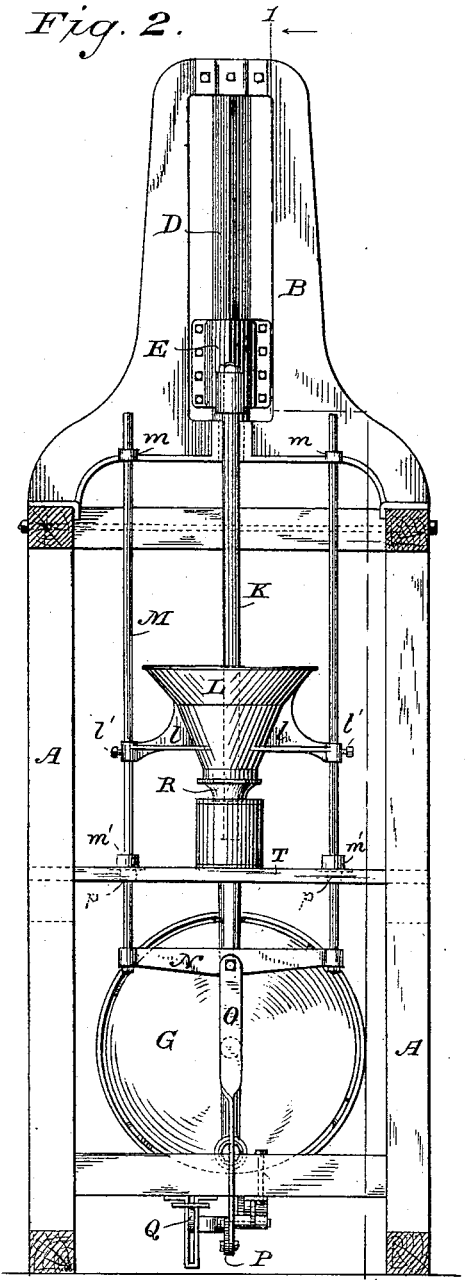
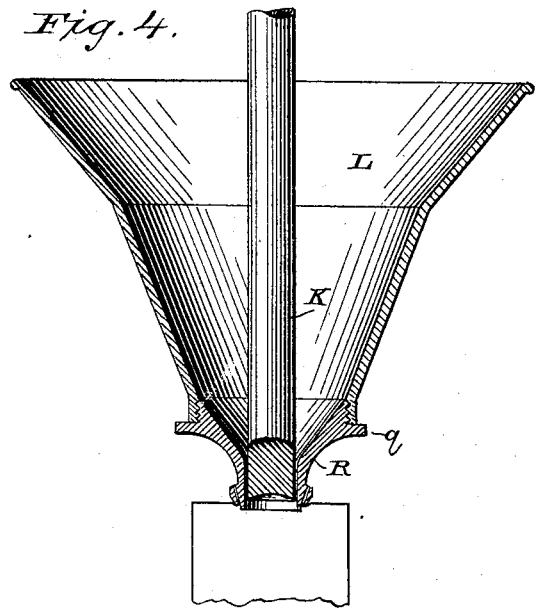
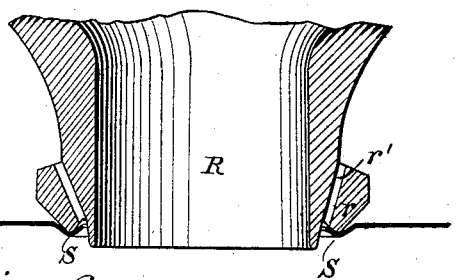
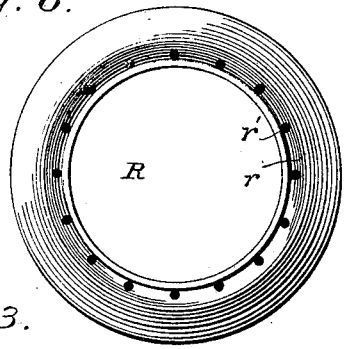
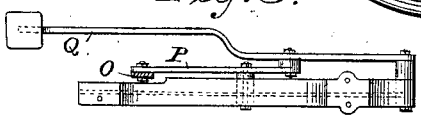
Witnesses
Wm A. Skinkle
Arthur Johnson.
Inventor
William R. Drueck
By his Attorneys
Offield Towle & Phelps

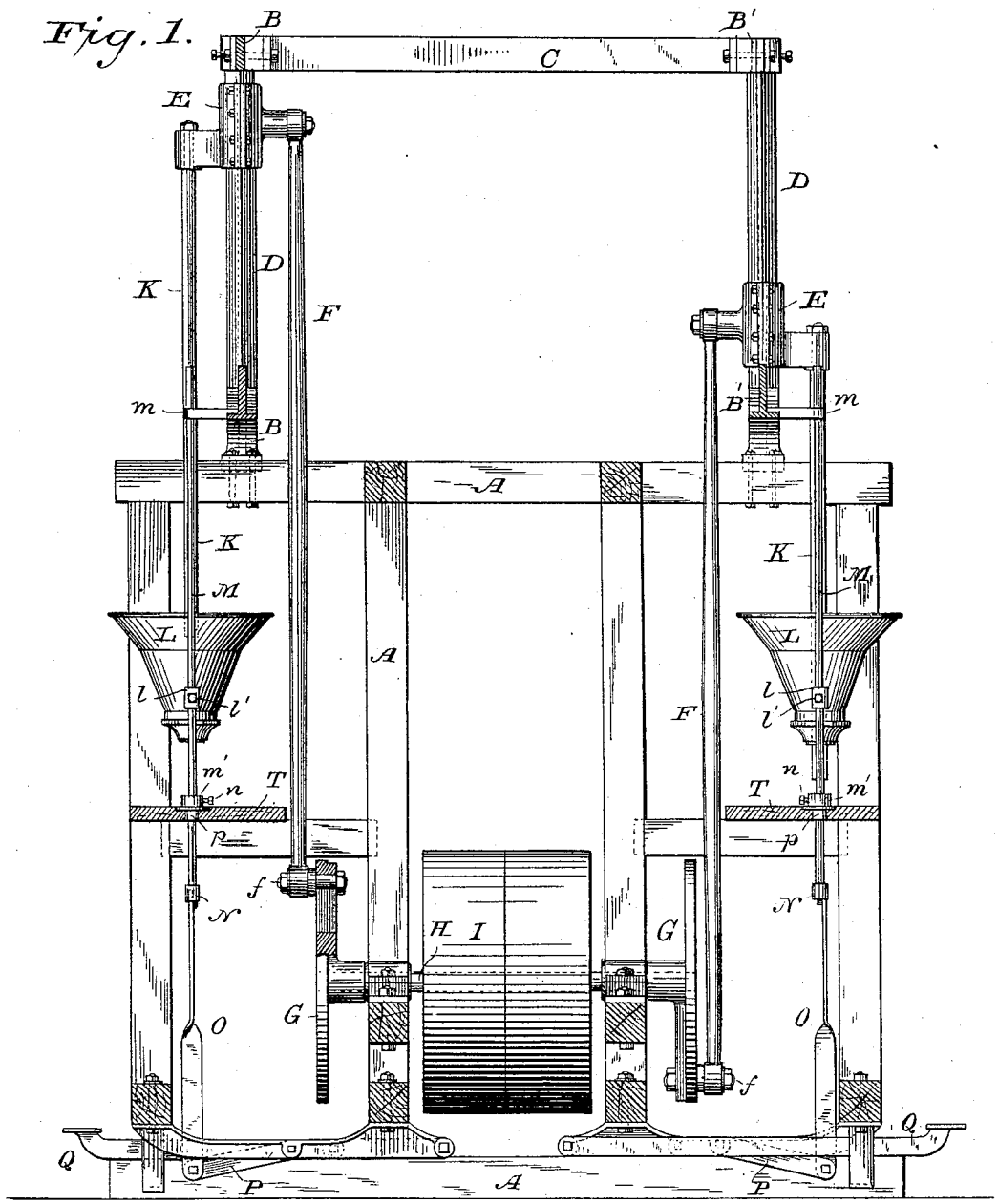

United States Patent Office.

WILLIAM R. DRUECK, OF CHICAGO, ILLINOIS, ASSIGNOR TO NELSON MORRIS, OF SAME PLACE.

CAN-STUFFING MACHINE.

SPECIFICATION forming part of Letters Patent No. 367,027, dated July 26, 1887.

Application filed March 1, 1887. Serial No. 229,272. (No model.)

*To all whom it may concern:*

Be it known that I, WILLIAM R. DRUECK, a citizen of the United States, residing in Chicago, in the county of Cook, State of Illinois, have invented certain new and useful Improvements in Can-Stuffing Machines, which I desire to protect by Letters Patent of the United States, and of which the following is a specification.

My invention relates to that class of machines used for packing meat and like substances into cans, wherein they are afterward sealed for preservation, and has for its object the production of a machine which shall operate with greater rapidity, certainty, and economy than any heretofore devised, and which shall be adapted for use with meats of all kinds and in all conditions, both as regards comminution and degree of cooking.

My invention further consists in certain details of construction, hereinafter fully described, and pointed out in the claims.

In the drawings annexed, forming a part of this specification, Figure 1 is a side view, partly in section, on line 1, Fig. 2, of one of my machines. Fig. 2 is an end elevation thereof. Fig. 3 is a plan view of one of the treadles by which parts of the machine are operated. Fig. 4 is a sectional view of the hopper for receiving the meat and directing it into the can in which it is to be packed. Figs. 5 and 6 represent, on a still larger scale, the nozzle of the hopper, Fig. 6 being a bottom plan view thereof.

Upon a suitable frame-work, A, are fixed two castings, B and B', connected at their tops by a cross-bar, C. Each of these castings B carries a post, D, which serves as a guide for a cross-head, E, connected by a pitman-rod, F, with a disk, G, mounted on a main shaft, H, driven through the medium of pulley I from a convenient source of power. The rod F is connected to the disk G by a crank-pin, $f$, passing through a radial slot in the disk and held thereto by a nut so that the stroke of the cross-head may be varied by adjusting the lower end of rod F to and from the shaft H. To the opposite side of the cross-head E is fixed a rod, K, which serves as a plunger for packing the meat into the cans.

The hopper L is carried by two arms, $l$, held by set-screws $l'$ to vertical rods M, moving in guide-collars $m$, fixed to the castings B. The lower ends of these rods are connected by a cross piece, N, to the center of which is pivoted a rod, O, connected with the lever P, pivoted to the frame-work, the other end of which is in turn pivoted to a treadle, Q. The hopper is provided at its lower end with a nozzle, R, having an interior bore a little larger than the plunger. The nozzle is made detachable from the hopper in order that it may be removed and replaced by one of different size when it is desired to use the machine for filling cans having larger or smaller top openings, and several sizes of nozzles are conveniently used with each machine. A shoulder, $q$, is provided on the nozzle, against which the hopper abuts. It is also desirable to have an assortment of plungers of various sizes with each machine, as well as an assortment of nozzles, as the plunger should be adapted in size to the top opening of the can as well as to the bore of the nozzle. The outside of the nozzle is beveled toward its lower end, and is provided with an annular rib, $r$, adapted to fit and rest in a groove, S, formed in the top of the can and around the opening through which the meat is introduced. The lower edge of the nozzle projects somewhat into the can when the rib $r$ rests upon the top of the can, as is shown in Fig. 5. The exterior surface of the nozzle at the point where it passes through the top of the can is made a little smaller than the opening in the can-top, so that the air which is compressed by the plunger as it enters the can may have a free vent. For the same purpose holes $r'$ are placed at intervals in the rib $r$ and extend up through it. The groove S serves to give steadiness to the hopper, and also to accurately center the nozzle, so that there will be at all times an annular space between the nozzle and the can-top. The lower edge of the rib $r$ is so shaped as to rest in the bottom of groove S, while a space is left between its inner bevel and the rising side of groove S to permit free passage of air to holes $r'$.

The downward movement of rods M is limited by the contact of collars $m'$, held thereto by set-screws $n$ and adjustable thereon with metal bushing $p$, set in shelf T, on which shelf the cans are placed to be filled. These collars relieve the cans of the weight of the hopper, and can be readily and accurately adjusted to any height of can.

The operation of the machine will now be described. Before the work begins the stroke of the plunger is determined for the size of the cans to be filled by adjusting the lower end of the pitman-rod F to or from the center of disk G. This stroke should be such that for cans of ordinary size the plunger will, when in its lower position, pass into the can about two and one-half inches. Before beginning work, also, the position of the hopper upon the rods M is adjusted so that the nozzle may be readily caused to rest upon and be lifted from the top of the can by the operator; also, the collars $m'$ are accurately adjusted upon rods M, so as to be precisely adapted to the height of the can to be filled. The hopper, being then filled with meat, is moved by the operator, whose foot is upon the treadle, until it rests upon the top of the can and the collars $m'$ are in contact with bushings $p$. As the main shaft H is revolved, the plunger at each reciprocation forces a certain quantity of meat into the can until the latter is sufficiently filled. The elasticity of the compressed meat is such that as the plunger leaves the can for the last time the expanding meat fills the space left by it. As before explained, the air which is forced from the can as the plunger descends into it with the meat passes out around the nozzle and through the holes $r'$. Some six or seven reciprocations of the plunger are required to fill the average can. The hopper is then quickly raised by the operator, and at the same time the filled can is removed and replaced by an empty one, all this being done between two strokes of the plunger.

Features of my invention, to which I desire to call particular attention, are the adjustability of the several parts, which enables me to readily adapt my machine to different sizes of cans, and the peculiar construction of the nozzle and hopper, and the arrangement in the same machine of two sets of cross-heads, plungers, &c., driven from a single main shaft. The two sets of plungers, cross-heads, &c., are so connected with the main shaft that they alternate in action and balance each other, one of the plungers being in its operative while the other is in its retractive position.

Having thus described my invention, what I desire to claim and protect by Letters Patent is—

1. In a can-stuffing machine, a hopper having a nozzle for the same provided with an annular rib formed integral therewith, and provided with vent-holes extending through said rib, substantially as described.

2. In a can-stuffing machine, a hopper having a nozzle provided with an annular metallic rib adapted to rest upon the top of the can when the latter is being filled, said annular rib being beveled upward and inward from its lower edge and provided with vent-holes passing upward through its mass from said bevel, substantially as and for the purpose set forth.

3. In a can-stuffing machine, the combination of a hopper, a vertically-movable frame for carrying the same, a shelf for supporting the can to be filled, and an adjustable stop adapted to limit the motion of the said frame with reference to the can and partially support the weight of the frame while the can is being filled, substantially as set forth.

4. In a can-stuffing machine, the combination of the rods M, means for moving the same vertically, hopper L, attached thereto, adjustable collars $m'$, and a bearing for said collars adapted to support the rods M and the hopper while the can is being filled, substantially as set forth.

5. In a can-stuffing machine, the combination of hopper L, rods M, to which it is attached, adjustable collars $m'$, shelf T, and bushings $p$, substantially as and for the purpose set forth.

6. In a can-stuffing machine, the combination of a hopper, a vertically-movable frame, means for causing the same to reciprocate up and down, and adjustable connections between the said frame and the said hopper, substantially as and for the purpose set forth.

WILLIAM R. DRUECK.

Witnesses:
FREDERICK C. GOODWIN,
HENRY M. WOLF.